(12) United States Patent
Mo et al.

(10) Patent No.: US 9,646,757 B2
(45) Date of Patent: May 9, 2017

(54) SURGE PROTECTIVE NETWORK SIGNAL PROCESSING CIRCUIT ASSEMBLY

(71) Applicant: AJOHO ENTERPRISE CO., LTD., Taipe (TW)

(72) Inventors: Chia-Ping Mo, Taipei (TW); You-Chi Liu, Taipei (TW)

(73) Assignee: Ajoho Enterprise Co., Ltd., Taipei (TW)

(*) Notice: Subject to any disclaimer, the term of this patent is extended or adjusted under 35 U.S.C. 154(b) by 34 days.

(21) Appl. No.: 14/876,386

(22) Filed: Oct. 6, 2015

(65) Prior Publication Data

US 2016/0028225 A1    Jan. 28, 2016

Related U.S. Application Data

(63) Continuation-in-part of application No. 14/180,854, filed on Feb. 14, 2014, now abandoned, which is a continuation-in-part of application No. 13/544,538, filed on Jul. 9, 2012, now Pat. No. 8,878,628.

(30) Foreign Application Priority Data

Apr. 20, 2012 (TW) ............................. 101112238 A

(51) Int. Cl.
| | |
|---|---|
| H01F 27/28 | (2006.01) |
| H01F 27/34 | (2006.01) |
| H01F 27/24 | (2006.01) |
| H04L 25/02 | (2006.01) |

(52) U.S. Cl.
CPC ............. *H01F 27/28* (2013.01); *H01F 27/24* (2013.01); *H01F 27/343* (2013.01); *H04L 25/0264* (2013.01)

(58) Field of Classification Search
CPC ........ H01F 27/28; H01F 27/24; H01F 27/343; H04L 25/0264
See application file for complete search history.

(56) References Cited

U.S. PATENT DOCUMENTS

| | | | |
|---|---|---|---|
| 1,799,174 A | 4/1931 | Loye | |
| 5,095,291 A | 3/1992 | Staschover et al. | |
| 5,109,206 A | 4/1992 | Carlile | |
| 6,097,262 A | 8/2000 | Combellack | |
| 7,728,692 B2 | 6/2010 | Fortier | |
| 8,319,579 B2 | 11/2012 | Zhuang et al. | |
| 9,007,148 B2* | 4/2015 | Shibata | H03H 7/0138 333/12 |
| 2006/0218422 A1* | 9/2006 | Camagna | H04L 12/10 713/300 |
| 2009/0265563 A1 | 10/2009 | Camagna et al. | |
| 2011/0243254 A1 | 10/2011 | Pischl | |

(Continued)

*Primary Examiner* — Scott Bauer
(74) *Attorney, Agent, or Firm* — Muncy, Geissler, Olds & Lowe, P.C.

(57) ABSTRACT

A surge protective network signal processing circuit assembly includes a network chip, a network connector and a processing circuit including a plurality of two-wire channels electrically connected in parallel between the network chip and the network connector and a plurality of signal coupling capacitors respectively mounted in the two-wire channels and electrically connected in parallel and grounded for discharging instantaneous high voltage surges.

5 Claims, 4 Drawing Sheets

(56) References Cited

U.S. PATENT DOCUMENTS

| | | | |
|---|---|---|---|
| 2014/0016289 A1* | 1/2014 | Chen | H05K 1/0233 361/783 |
| 2014/0321574 A1* | 10/2014 | Wei | H04L 25/0266 375/296 |
| 2016/0294346 A1* | 10/2016 | Xu | H01F 27/24 |

* cited by examiner

SURGE PROTECTIVE NETWORK SIGNAL PROCESSING CIRCUIT ASSEMBLY

This application is a Continuation-in-part of co-pending application Ser. No. 14/180,854, filed on Feb. 14, 2014, which is a Continuation-in-Part of application Ser. No. 13/544,538, filed on Jul. 9, 2012, which issued as U.S. Pat. No. 8,878,628 on Nov. 4, 2014, for which priority is claimed under 35 U.S.C. §120, and this application claims priority of Application No. 101112238 filed in Taiwan on Apr. 6, 2012, under 35 U.S.C. §119; the entire contents of all of which are hereby incorporated by reference.

BACKGROUND OF THE INVENTION

1. Field of the Invention

The present invention relates to network technology and more particularly, to a surge protective network signal processing circuit assembly, which has a self-coupling AC regulator installed in each two-wire channel of the processing circuit thereof for discharging voltage surges to a ground terminal, avoiding power surge damage in a lightning.

2. Description of the Related Art

With fast development of computer technology, desk computers and notebook computers are well developed and widely used in different fields for different applications. It is the market trend to provide computers having high operating speed and small size. Further, network communication technology brings people closer together, helping people to gather information about living, learning, working and recreational activities. By means of network communication, people can communicate with one another to send real time information, advertising propaganda or e-mail. Further, through the Internet, people can search information, send instant messages, or play on-line video games. The development of computer technology makes the relationship between people and network unshakable and inseparable.

In a network, cable or wireless interference means may be selectively used for data transmission. The technology of cable connection for network application needs to use network connectors. With the development of network applications, the data transmission capacity is greatly increased. In order to satisfy users' demands, network connection speed has been greatly improved from the rate of 10 Mbps up to 100 Mbps or 1 Gbps. The advanced fiber optic network speed can support 10 Gbps. However, if a network signal line gets struck by a lightning, the unusual electrical surge from the lightning strike can affect signal transmission stability, interrupting the connection, or causing damage to the network chip, circuit board or other connected electronic components or devices (computer, router, etc.). Computer networks are categorized by their scope or scale. The usually said categories of networks are LAN (local area network), MAN (metropolitan area network), WAN (wide area network). The most well-known WAN is the Internet. When linking a network signal, or uploading or downloading network data, external electromagnetic noises and internal surging noises (such as lightning strikes) can affect signal transmission stability. Therefore, it is necessary to install filter devices in network connectors for removing noises, electromagnetic waves and voltage surges. However, the filter devices of conventional network connectors cannot effectively remove all instantaneous high voltage surges caused by lightning strikes to prevent damage to the network chip and other connected electronic components.

Therefore, it is desirable to provide a network processing circuit that is capable of discharging instantaneous high voltage surges caused by lightning strikes, avoiding network chip and components damage or signal transmission interruption.

SUMMARY OF THE INVENTION

The present invention has been accomplished under the circumstances in view. It is therefore the main object of the present invention to provide a surge protective network signal processing circuit assembly, which uses a self-coupling AC regulator in each two-wire channel of the processing circuit thereof for discharging voltage surges to a ground terminal, avoiding power surge damage.

To achieve this and other objects of the present invention, a surge protective network signal processing circuit assembly of the present invention comprises a network chip, a network connector, and a processing circuit connected between the network chip and the network connector. The processing circuit comprises a plurality of two-wire channels electrically connected in parallel between the network chip and the network connector, a signal coupling capacitor mounted in each two-wire channel, and a self-coupling AC regulator electrically connected in parallel to each two-wire channel between the network connector and the associating signal coupling capacitor and grounded for discharging instantaneous high voltage surges caused by lightning strikes, avoiding power surge damage and signal transmission interruption.

Further, each self-coupling AC regulator comprises an iron core in a rectangular or annular shape, and two windings wound round the iron core at two opposite sides. The two windings are connected in series to a grounding terminal and respectively electrically connected to the two wires of the respective two-wire channel.

DETAILED DESCRIPTION OF THE PREFERRED EMBODIMENT

Figure 1:
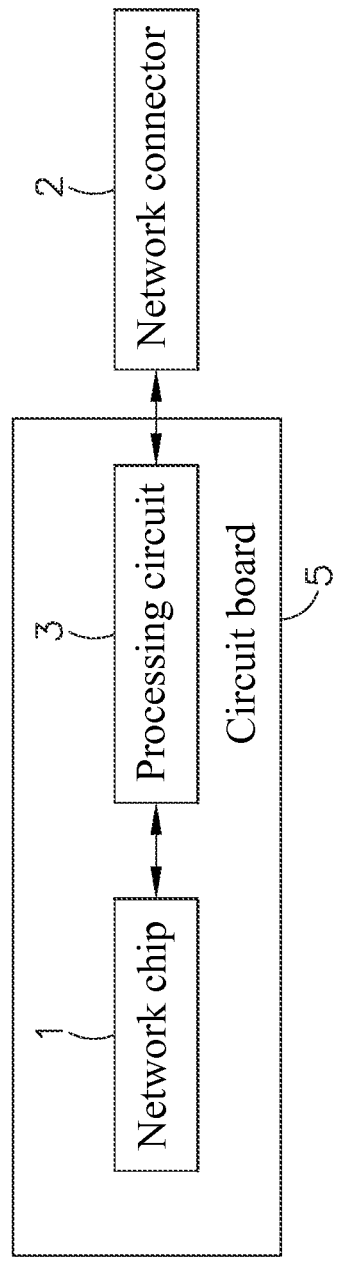
FIG. 1 is a block diagram of a surge protective network signal processing circuit assembly in accordance with the present invention.
Figure 2:
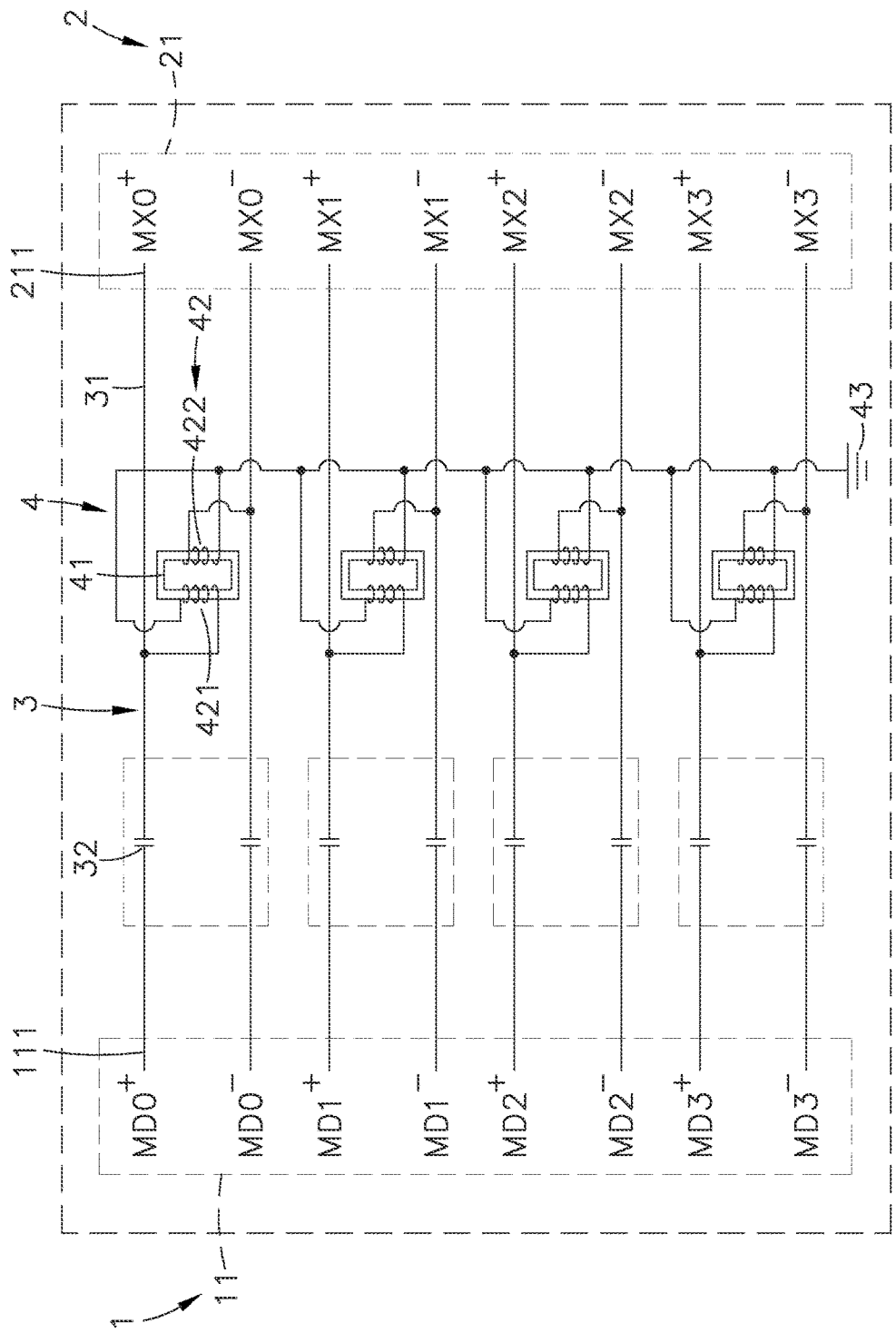
FIG. 2 is a circuit diagram of the processing circuit of the surge protective network signal processing circuit assembly in accordance with the present invention.
Figure 3:
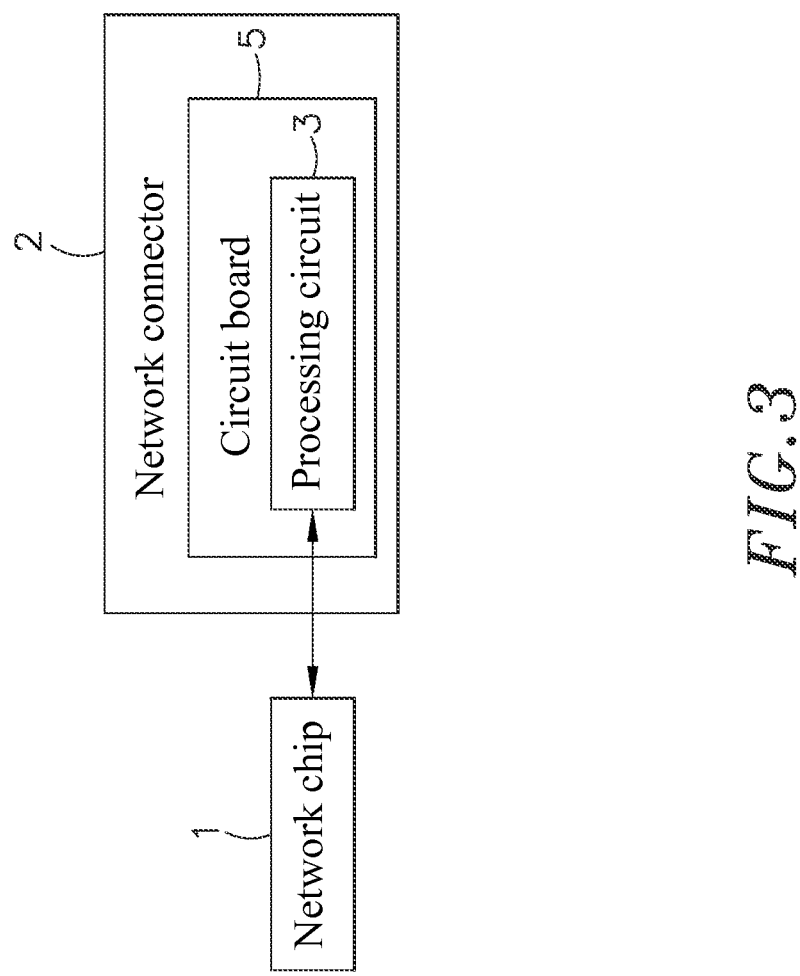
FIG. 3 is an alternate form of the block diagram of the surge protective network signal processing circuit assembly in accordance with the present invention.

Referring to FIGS. 1-3, a surge protective network signal processing circuit assembly in accordance with the present invention is shown. As illustrated, the surge protective network signal processing circuit assembly comprises a network chip 1, a network connector 2, and a processing circuit 3 connected between the network chip 1 and the network connector 2.

The network chip 1 comprises a set of pins 11 for transmitting electronic/voltage signals. The network connector 2 comprises a set of contacts 21 for transmitting electronic/voltage signals. The processing circuit 3 comprises at least one, for example, four two-wire channels 31 electrically connected in parallel between the set of pins 11 of the network chip 1 and the set of contacts 21 of the network connector 2, a signal coupling capacitor 32 electrically connected to each two-wire channel 31, and a self-coupling AC regulator 4 electrically connected in parallel to each two-wire channel 31 between the network connector 2 and the associating signal coupling capacitor 32. Each self-coupling AC regulator 4 comprises an iron core 41, and at least one winding 42 wound round the iron core 41. The at least one winding 42 of each self-coupling AC regulator 4 has opposing input end 421 and output end 422 respectively and electrically connected to the two wires of the respective two-wire channel 31. Further, the windings 42 of the self-coupling AC regulators 4 are electrically connected to a ground terminal 43 to form a self-coupling AC regulator loop.

Further, the network chip 1 and the processing circuit 3 can be installed in a circuit board 5, and then electrically connected to the network connector 2 through the circuit board 5. Alternatively, the network connector 2 and the processing circuit 3 can be installed in a circuit board 5, and then electrically connected to the network chip 1 through the circuit board 5. The circuit board 5 provides the network chip 1, the network connector 2 and the processing circuit 3 with the necessary working power supply. Further, the circuit board 5 can be equipped with a power source (such as dry battery, rechargeable battery, lithium-ion battery or button cell), or electrically connected to a city power outlet through a power cable to obtain the necessary working power supply. The arrangement of the network chip 1, the network connector 2 and the processing circuit 3 is of the known technique and not within the scope of the technical features of the present invention, no further detailed description in this regard will be necessary. The network chip 1 is a voltage-mode chip configured to provide a driving voltage to the processing circuit 3. Because signal changes its value or voltage during a transmission, if a current-mode network chip is used, the signal coupling capacitor 32 needs to provide a resistor for generating a voltage for signal transmission. Using this voltage-mode network chip 1 eliminates the arrangement of an extra resistor. In this embodiment, the processing circuit 3 has one signal coupling capacitor 32 electrically connected to each two-wire channel 31 thereof. Subject to the effect of the characteristic of the signal coupling capacitor 32 in each two-wire channel 31, when the supplying voltage flows to the first end of the signal coupling capacitor 32, a transient charge of single polarity (for example, positive charge) is created at the first end of the signal coupling capacitor 32, and another transient charge of opposite polarity (for example, negative charge) is created at the second end of the signal coupling capacitor 32. After a predetermined length of time, the supply of positive charge to the first end of the signal coupling capacitor 32 is stopped, and the negative charge is discharged out of the second end of the signal coupling capacitor 32 through the associating two-wire channel 31, achieving the transmission effect of signal coupling. At this time, the signal coupling capacitor 32 prohibits transmission of the signal through the associating two-wire channel 31, achieving the effect of reverse current prevention. However, because the charging and discharging speed of the signal coupling capacitor 32 has a great concern with time constant, time constant must match signal period so that the charging discharging time allows complete signal transmission and will not cut off the signal. If the capacitance of the signal coupling capacitor 32 is increased, the time constant will also increase. Thus, the capacitance of the signal coupling capacitor 32 can be in the range of 100 µF~0.01 µF, or preferably, 0.1 µF.

Further, the signal coupling capacitors 32 of the processing circuit 3 in the two-wire channels 31 enable the circuits at the two opposite ends thereof to be electrically coupled together. The impedance (Z) of the signal coupling capacitors 32 is called capacitive reactance measured in ohms (Ω). The impedance (Z) can be calculated using this formula: $Z=1/(2\pi*F*C)$, wherein F: frequency in hertz (Hz); C: the capacitance of the capacitor in microfarads (µF). Due to the use of the characteristics of capacitance for electrical isolation and signal coupling, it can be known from the above formula that the capacitive reactance is inversely proportional to the operating frequency and the capacitance of the capacitor. If the capacitance of the signal coupling capacitor 32 in each two-wire channel 31 remains unchanged, increasing the signal frequency causes reduction of the capacitive reactance, thereby lowering signal attenuation and accelerating network signal transmission speed. Due to the use of the capacitive characteristic that the strength is increased with the increase in signal frequency, the application of high network frequency (bandwidth) today (more than 1 Gbps) enables the signal coupling capacitors 32 to use the isolated direct current power from the computer for coupling signals. Further, the characteristics of the signal coupling capacitors 32 also effectively enhance the high-frequency network signal coupling effect.

Further, the processing circuit 3 has the respective one ends of the two-wire channels 31 respectively electrically connected to pins 111 of the set of pins 11 of the network chip 1. The pins 111 of the set of pins 11 of the network chip 1 in the present preferred embodiment are identified as $MD0^+$, $MD0^-$, $MD1^+$, $MD1^-$, $MD2^+$, $MD2^-$, $MD3^+$ and $MD3^-$. However, this configuration layout of the pins 111 is changeable to fit different design requirements. Further, the processing circuit 3 has the respective opposite ends of the two-wire channels 31 respectively electrically connected to contacts 211 of the set of contacts 21 of the network connector 2. The contacts 211 of the set of contacts 21 of the network connector 2 in the present preferred embodiment are identified as $MX0^+$, $MX0^-$, $MX1^+$, $MX1^-$, $MX2^+$, $MX2^-$, $MX3^+$ and $MX3^-$. However, this configuration layout of the contacts 211 is changeable to fit different design requirements.

Further, as stated above, each self-coupling AC regulator 4 comprises one iron core 41 in the shape of a rectangular frame (or alternatively, annular shape), and two windings 42 respectively wound round the iron core 41 at two opposite sides. The two windings 42 of each self-coupling AC regulator 4 are respectively terminated in one input end 421 and one output end 422 and respectively and electrically connected to the two wires of the respective two-wire channel 31. Further, the two windings 42 of each self-coupling AC regulator 4 are electrically connected in series with the connected part therebetween electrically connected to the ground terminal 43.

Figure 4:
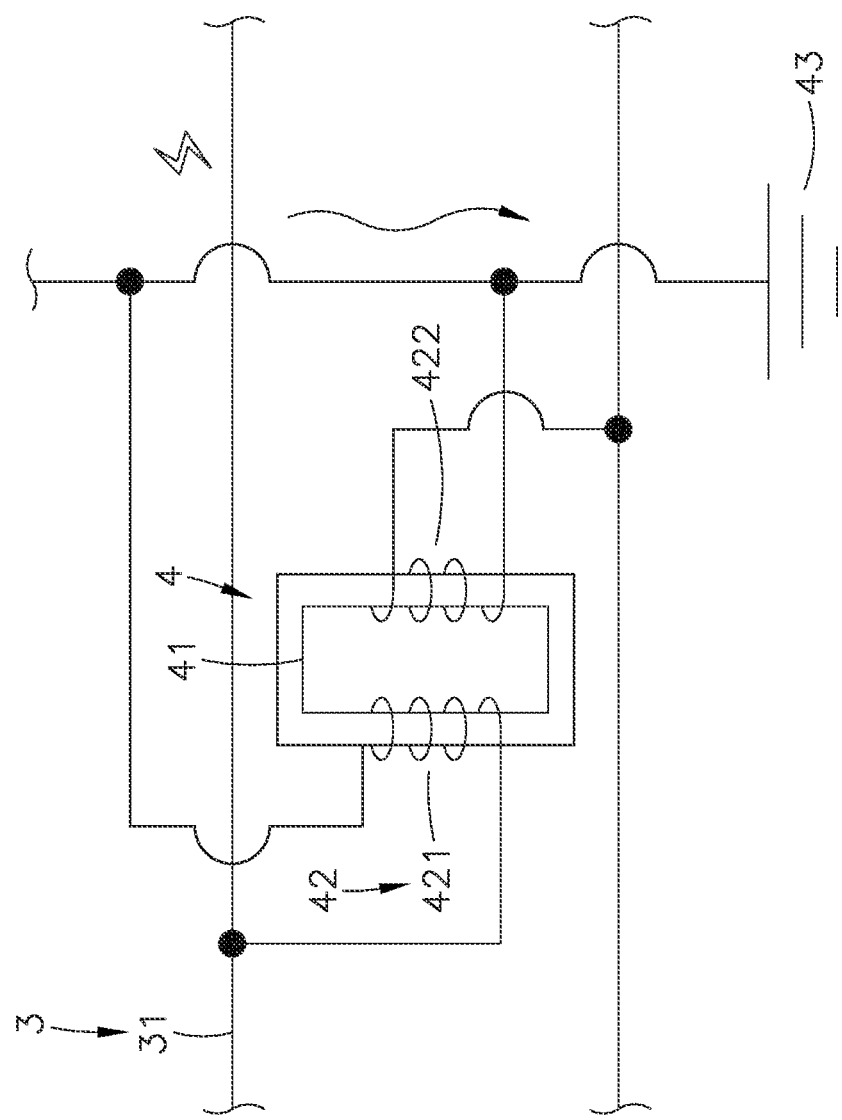
FIG. 4 is a circuit diagram of a self-coupling AC regulator in accordance with the present invention.

Referring to FIGS. 2 and 4, when an instantaneous high voltage occurs upon a lightning spike during transmission of a network signal through the contacts 211 of the set of contacts 21 of the network connector 2, the surge (voltage spike) is transmitted through the network connector 2 to every two-wire channel 31 of the processing circuit 3 and the self-coupling AC regulator 4 in each two-wire channel 31. Subject to the effect of the internal low resistance (about 0.1Ω~10Ω) in each self-coupling AC regulator 4, each self-coupling AC regulator 4 transmits this instantaneous high voltage (several kilovolts) to the ground terminal 43, avoiding power surge damage. Through a network surge generator test system, surge information can be analyzed and reported.

Conventional DC filters for use in a network line are simply capable of removing DC and low frequency noises. Further, a DC or low frequency noise, or a surge, caused by static electricity or lightning, is a low frequency signal of short duration spike in electrical circuits with 1 kHz~1 MHz frequency and amplitude several volts. Its rise time in voltage is about 1~10 μs. The transmission speed of network connectors and high-speed electrical connectors are normally within the range of 10 Mb/s~1 Gb/s, and the frequencies of the related transmission signals are normally within the range of 2.5 MHz~125 MHz, i.e., over 1 MHz. Thus, a frequency threshold, for example, 1 MHz, can be set in a high-pass DC filter to remove low frequency signals, enabling any signal of frequency above the set frequency threshold to pass. With respect to the impact of an instantaneous high voltage caused by a lightning, if 10/700 μs works with a network surge generator of internal resistance about 15Ω for surge testing subject to IEC60950-4-5 standard, the external resistance should be equal to about 25Ω. If a 10/100M network cable is used, each of the 8 lines has 8 pcs of 200Ω resistors connected thereto in series (8 sets of 200Ω are parallel equivalent, forming the external 25Ω equivalent resistance). For example, when the network surge generator generates 6 KV instantaneous high voltage (low-frequency DC power), it is dropped by the self-coupling AC regulator 4 (DC resistance 0.1Ω~10Ω) subject to the formula of:

6 KV/(15+200+1)×1Ω (the resistance of the self-coupling AC regulator 4 in this example is 1Ω)≈27.778V.

Thus, the surge (voltage spike) transmitted to the network connector 2 is dropped by the self-coupling AC regulators 4 to the level of 27.778V, and the other large voltage (about 5.97 KV) is discharged by the self-coupling AC regulators 4 through the ground terminal 43, avoiding power surge damage. After processed through the self-coupling AC regulators 4, the voltage level left in the processing circuit 3 is 27.778V that is sustainable by the processing circuit 3 (a network line can sustain voltages of several tens to several hundred volts; the processing circuit 3 has a 0.1 μF coupling capacitor 32 installed in each two-wire channel 31 to bear a voltage under 50V). When the network connector 2 receives an instantaneous high voltage upon a lightning spike during transmission of a network signal, the surge (voltage spike) can be dropped by the self-coupling AC regulators 4 and will not be transmitted to the pins 111 of the set of pins 11 of the network chip 1, avoiding power surge damage to the processing circuit 3 and the network chip 1 or the problem of network signal attenuation.

Further, as stated above, each self-coupling AC regulator 4 comprises one iron core 41, and two windings 42 respectively wound round the iron core 41 at two opposite sides. The two windings 42 of each self-coupling AC regulator 4 are respectively terminated in one input end 421 and one output end 422 that are respectively and electrically connected to the two wires of the respective two-wire channel 31. Further, the two windings 42 of each self-coupling AC regulator 4, i.e., the respective other ends of the input end 421 and output end 422 are electrically connected in series to the ground terminal 43. Thus, when the two-wire channels 31 of the processing circuit 3 are used for network signal transmission (AC power transmission, the induction capacity of the self-coupling AC regulators 4 can be in the range of 40 μH~800 μH (or preferably, 80 μH) to fit different application requirements. If the equivalent impedance is about 100 MHz, the resistance of the self-coupling AC regulators 4 can be in the range of 200Ω~10,000Ω without affecting network signal transmission. Thus, 10M, 100M or 1G signals can pass through the surge protective network signal processing circuit assembly smoothly without causing network signal interruption or attenuation, or interference from the self-coupling AC regulators 4. Further, the inductance of the self-coupling AC regulators 4 can be calculated subject to the formula of:

$$\text{Inductive reactance (ohm)} = 2\pi \times F \times L,$$

in which: the parameter F is the operating frequency (Hz); the parameter L is the inductance (μH); π=3.14159.

If the network signal (high-frequency signal) of operating frequency (F) 10,000,000 HZ and inductance (L) 80 μH is applied, the inductive reactance of the self-coupling AC regulator 4 will be: 2×3.14159×10,000,000×80=50,265.44 Ohms)≈50K Ohms).

When the network receives a lightning strike (low-frequency signal), the instantaneous high voltage (10/700 μs voltage waveform test, 10 μs+700 μs≈1 mμs≈1 KHZ=F) and the operating frequency is F=1000 HZ, the inductive reactance of the self-coupling AC regulators 4 can be calculated using the inductance value (L=80 μH) of the self-coupling AC regulators 4 as: 2×3.14159×1,000×80=5.026544 Ohms≈5 Ohms) [the equivalent impedance of the self-coupling AC regulators 4 can be in the range of 200Ω~10,000Ω], thus, the instantaneous high voltage produced upon a lightning strike can be known from the above formula. The inductive reactance is directly proportional to the operating frequency and the inductance value, therefore, when the operating frequency is increased, the inductive reactance will be relatively increased. However, increasing the inductive reactance relatively enhances signal attenuation, leading to interruption or lowering the network signal transmission speed. Subject to the coupling and buffering effects of the self-coupling AC regulators 4 to lower the inductive reactance (the inductive reactance is lowered to about 5 Ohms], the processing circuit 3 of the invention effectively avoids signal attenuation and transmission interruption, and thus, signals can be smoothly transmitted through the two-wire channels 31 even if an instantaneous high voltage surge is caused by a lightning strike.

As described above, the invention provides a surge protective network signal processing circuit assembly, which comprises a network chip 1, a network connector 2, and a processing circuit 3 connected between the network chip 1 and the network connector 2, wherein the processing circuit 3 comprises at least one, for example, four two-wire channels 31 electrically connected in parallel between pins 111 of the network chip 1 and contacts 211 of the network connector 2, a signal coupling capacitor 32 electrically connected to each two-wire channel 31, and a self-coupling AC regulator 4 electrically connected in parallel to each two-wire channel 31 between the network connector 2 and the associating signal coupling capacitor 32. Further, each self-coupling AC regulator 4 comprises an iron core 41, and two windings 42 wound round the iron core 41 at two opposite sides and electrically connected to a ground terminal 43. Subject to the functioning of the self-coupling AC regulators 4, any instantaneous high voltage can be dropped, avoiding power surge damage.

In conclusion, the surge protective network signal processing circuit assembly of the invention has the processing circuit electrically connected between the network chip and the network connector and configured to provide a plurality of two-wire channels, a plurality of signal coupling capacitors respectively and electrically connected to the two-wire channels and a plurality of self-coupling AC regulators respectively electrically connected in parallel to the two-wire channels between the network connector and the signal coupling capacitors and grounded for discharging instantaneous high voltage, avoiding network chip and components damage or signal transmission interruption.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. A surge protective network signal processing circuit assembly, comprising a network chip, a processing circuit and a network connector for transmitting a network signal, said network chip being electrically connected to said network connector through said processing circuit, said processing circuit comprising a plurality of two-wire channels electrically connected in parallel between respective pins of said network chip and respective contacts of said network connector and a plurality of signal coupling capacitors respectively electrically mounted in said two-wire channels; wherein said signal coupling capacitors of said processing circuit each have a capacitance value in the range of 100 μF~0.01 μF; said processing circuit further comprises a plurality of self-coupling AC regulators respectively and electrically connected in parallel to said two-wire channel between said network connector and said signal coupling capacitors connected to lower the capacitive reactance, each said self-coupling AC regulator having a resistance value in the range of 0.1Ω~10Ω, each said self-coupling AC regulator comprising an iron core and two windings wound round said iron core at two opposite sides, one said winding having one end thereof terminating in an input end and electrically connected to one of the two wires of the associating said two-wire channel and the opposite end thereof electrically connected with one end of the other said winding to a grounding terminal for discharging instantaneous high voltage surges caused by lightning strikes, the other said winding having an opposite end thereof terminating in an output end and electrically connected to the other of the two wires of the associating said two-wire channel.

2. The surge protective network signal processing circuit assembly as claimed in claim 1, wherein said iron core of each said self-coupling AC regulator is a rectangular iron frame; the two said windings are respectively wound round two opposite sides of the rectangular iron frame of said iron core.

3. The surge protective network signal processing circuit assembly as claimed in claim 1, wherein the resistance value of each said signal coupling capacitor is preferably 1Ω.

4. The surge protective network signal processing circuit assembly as claimed in claim 1, wherein each said self-coupling AC regulator has an inductive reactance (ohm) =2π×F×L, in which: the parameter F is the operating frequency (Hz); the parameter L is the inductance (μH); π=3.14159.

5. The surge protective network signal processing circuit assembly as claimed in claim 1, wherein the capacitance value of each said signal coupling capacitor is preferably 0.1 μF.

* * * * *